United States Patent [19]

Inoue et al.

[11] Patent Number: 4,626,263

[45] Date of Patent: Dec. 2, 1986

[54] HIGH-PERFORMANCE ELECTRET AND AIR FILTER

[75] Inventors: Naofumi Inoue, Iwakuni; Satoshi Matsuura, Otake, both of Japan

[73] Assignee: Mitsui Petrochemical Industries, Ltd., Tokyo, Japan

[21] Appl. No.: 726,367

[22] Filed: Apr. 23, 1985

[30] Foreign Application Priority Data

Apr. 24, 1984 [JP] Japan ................................. 59-81033

[51] Int. Cl.4 ......................... B03C 3/45; B03C 3/64; B03C 3/28
[52] U.S. Cl. ................................. 55/155; 55/DIG. 39; 307/400
[58] Field of Search ......................... 55/155, DIG. 39; 307/400

[56] References Cited

U.S. PATENT DOCUMENTS 3,607,754  9/1971  Asahina et al. .................. 307/400 X
3,793,715  2/1974  Murayama et al. ............. 307/400 X
3,985,666 10/1976  Ciccarelli et al. .................. 307/400
4,204,135  5/1980  Murayama ..................... 307/400 X
4,215,682  8/1980  Kubik et al. ...................... 55/155 X
4,513,049  4/1985  Yamasaki et al. ............... 307/400 X Primary Examiner—Kathleen J. Prunner
Attorney, Agent, or Firm—Sherman and Shalloway

[57] ABSTRACT

Disclosed is a high-performance electret comprising 60 to 99% by weight of a non-polar polymer, 0.5 to 39.5% by weight of a polar polymer and 0.5 to 20% by weight of at least one component selected from the group consisting of (A) a non-polar polymer modified with an unsaturated carboxylic acid or a derivative thereof, (B) a non-polar polymer modified with an unsaturated epoxy monomer and (C) a non-polar polymer modified with a silane monomer having an olefinically unsaturated bond.

In this electret, a high charge density can be maintained stably over a long period, and this electret can be easily formed into a film. An air filter prepared from this electret is very excellent in the dust collecting efficiency.

6 Claims, 3 Drawing Figures

HIGH-PERFORMANCE ELECTRET AND AIR FILTER

BACKGROUND OF THE INVENTION

(1) Field of the Invention

The present invention relates to a high-performance electret which can stably hold a high surface charge density over a long period and can be formed into a film. Furthermore, the present invention relates to an air filter having excellent efficiency in dust collection, which is fabricated by using this electret.

(2) Description of the Prior Art

Various proposals have been made on polymeric electrets. Most of the known polymeric electrets are composed solely of a non-polar or polar polymeric material or binary electrets comprising a non-polar polymer and a polar polymer. Characteristics of these known polymeric electrets will now be described. In the case of an electret of a non-polar polymer represented by polyethylene or polypropylene, since the electric conductivity is low, charges once trapped hardly disappear, and since the polymer is hydrophobic, it is said that charges hardly disappear even if the electret comes in contact with water. Furthermore, since the polymer has no polarity, the quantity of charges trapped at the electret-forming step is small and the capacity of the formed electret is insufficient. In the case of a polar polymer such as polyethylene terephthalate or polycarbonate, since the polymer contains a polar group in the molecule unlike the above-mentioned non-polar polymer, the quantity of charges trapped at the electret-forming step is large, and the formed electret is characterized in that the initial electret capacity is high. However, since the electric conductivity is high, charges readily disappear with the lapse of time and it is difficult to maintain a high electret capacity for a long time, and since the polymer is hydrophilic, charges readily disappear if the electret comes in contact with water. Binary electrets comprising these two types of polymers have been developed and proposed so as to utilize the merits of both the polar and non-polar polymers and provide electrets retaining the excellent characteristics of both the polymers. In connection with these binary electrets, it is known that a blend system in which a non-polar polymer is a matrix and a polar polymer is a domain is excellent as an electret over a blend system of a reverse structure in which a polar polymer is a matrix and a non-polar polymer is a domain. For example, in "Collection of Lectures on Polymers", Volume 38, No. 9 (1981), pages 587-591, it is reported that an electret can be formed from a binary blend comprising polystyrene as the non-polar polymer and chlorinated polyethylene as the polar polymer. It is taught in this report that in the case of a multiple-phase blend, charges are easily trapped in the boundary region between components and that in the case of a micro-phase dispersed structure in which polystyrene is a domain and chlorinated polyethylene is a matrix, charges trapped in the polystyrene/chlorinated polyethylene interface are readily removed, migrate through the continuous matrix of chlorinated polyethylene having a low electric resistance and disappear. Also it is taught that in the case of a micro-phase dispersed structure in which polystyrene is a matrix and chlorinated polyethylene is a domain, charges trapped in the interface are inhibited from migrating by the polystyrene matrix which is an insulating phase and damping of charges is hence delayed. However, the compatibility between these non-polar and polar polymers is poor and therefore, according to the ordinary melt-blending method, it is impossible to reduce the particle size of the domain to several $\mu m$. This means that the ordinary melt-blending method can hardly be adopted for obtaining a filmy electret having a thickness of several $\mu m$, rather a special blending method such as the solvent method should be adopted. However, adoption of the solvent method is not preferred from the industrial view point because the electric characteristics are substantially influenced by the residual solvent and complicated steps are necessary for evaporation and recovery of the solvent.

SUMMARY OF THE INVENTION

Under this background, we made research with a view to obtaining a polymeric electret capable of being formed into a film and retaining a high charge density stably for a long time even according to the ordinary melt-blending method, and as the result, we have now completed the present invention.

More specifically, in accordance with one fundamental aspect of the present invention, there is provided a high-performance electret comprising 60 to 99% by weight of a non-polar polymer, 0.5 to 39.5% by weight of a polar polymer and 0.5 to 20% by weight of at least one component selected from the group consisting of (A) a non-polar polymer modified with an unsaturated carboxylic acid or a derivative thereof, (B) a non-polar polymer modified with an unsaturated epoxy monomer and (C) a non-polar polymer modified with a silane monomer having an olefinically unsaturated bond.

In accordance with another aspect of the present invention, there is provided an air filter composed substantially of a fibrous polymeric electret, said electret comprising 60 to 99% by weight of a non-polar polymer, 0.5 to 39.5% by weight of a polar polymer and 0.5 to 20% by weight of at least one component selected from the group consisting of (A) a non-polar polymer modified with an unsaturated carboxylic acid or a derivative thereof, (B) a non-polar polymer modified with an unsaturated epoxy monomer and (C) a non-polar polymer modified with a silane monomer having an olefinically unsaturated bond.

DETAILED DESCRIPTION OF THE PREFERRED EMBODIMENTS

Figure 1:
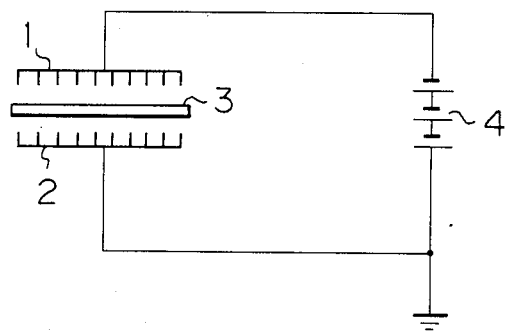
FIG. 1 is an arrangement diagram illustrating an apparatus used for formation of an electret.

The polymeric electret of the present invention is not the above-mentioned binary electret comprising a non-polar polymer and a polar polymer but is a ternary electret comprising a specific modified non-polar polymer described below as a component. By incorporation of this component, the domain particle size of the polar polymer dispersed in the matrix of the non-polar polymer can be reduced, and a domain particle size smaller than 1 $\mu m$ can be easily obtained even according to the ordinary melt-blending method. Moreover, the quantity of the trapped charged is increased as compared with the quantity of charges trapped in the case of the binary polymeric electret, and an electret having a higher surface charge density can be obtained. This means that a filmy electret having a reduced thickness can be easily prepared and a high-performance air filter can be produced.

Any of the so-called non-polar polymers can be used as the non-polar polymer constituent of the polymeric electret of the present invention. Most of these non-polar polymers are characterized by a dielectric loss (dielectric tangent, tan δ) smaller than 0.0005 (ASTM D-150, 60 Hz) and a volume resistivity of $10^{16}$ to $10^{20}\Omega$-cm (ASTM D-257, 23° C., relative humidity of 50%). As examples of the non-polar polymer, there can be mentioned polyolefins such as polyethylene and polypropylene, polystyrene, polytetrafluoroethylene and a tetrafluoroethylene/hexafluoroethylene copolymer.

Any of thermoplastic polymers ordinarily called polar polymers can be used as another constituent of the electret of the present invention. Most of these polar polymers are characterized by a dielectric loss larger than 0.0005, especially larger than 0.001, and a volume resistivity of $10^{12}$ to $10^{16}\Omega$-cm. For example, there can be mentioned thermoplastic resins which are melt-moldable and contain at least one polar group selected from carboxylic acid groups, ester groups, amide groups, hydroxyl groups, ether groups, nitrile groups, carboxyl groups and chlorine atoms, especially polyesters such as polyethylene terephthalate and polytetramethylene terephthalate, polyamides such as nylon 6, nylon 66 and nylon 12, polycarbonates, acrylic resins such as poly(methyl methacrylate) and poly(ethyl acrylate), acrylic/styrene resin (AS resins), acrylic/butadiene/styrene resins (ABS resins), polyvinyl chloride, polyvinylidene chloride, polyethylene chlorotrifluoride, polyacetal and polyacrylonitrile. Of course, polar polymers that can be used in the present invention are not limited to those exemplified above.

At least one polymer selected from the above-mentioned modified non-polar polymers (A), (B) and (C) is used as a component in the present invention. Of course, a mixture of two or more of these modified polymers may be used. By the term "modification" as used heren is meant bonding of a modifier to the non-polar polymer.

The non-polar polymer (A) modified with an unsaturated carboxylic acid or a derivative thereof is obtained by random-copolymerizing or block-copolymerizing a monomer constituting the non-polar polymer with an unsaturated carboxylic acid monomer or by graft-copolymerizing an unsaturated carboxylic acid to the non-polar polymer.

As the unsaturated carboxylic acid or its derivative, there can be mentioned unsaturated carboxylic acids such as acrylic acid, methacrylic acid, α-ethylacrylic acid, maleic acid, fumaric acid, itaconic acid, citraconic acid, tetrahydrophthalic acid, methyltetrahydrophthalic acid, endo-cis-bicyclo(2,2,1)-hepto-5-ene-2,3-dicarboxylic acid and methyl-endo-cis-bicyclo(2,2,1-)hepto-5-ene-2,3-dicarboxylic acid, and derivatives of these unsaturated carboxylic acids, such as acid halides, amides, imides, acid anhydrides and esters. As specific examples, there can be mentioned malenyl chloride, maleimide, maleic anhydride, citraconic anhydride, monomethyl maleate and dimethyl maleate. Unsaturated dicarboxylic acids and anhydrides thereof are preferred, and maleic acid, endo-cis-bicyclo(2,2,1)hepto-5-ene-2,3-dicarboxylic acid and anhydrides thereof are especially preferred.

The non-polar polymer (B) modified with an unsaturated epoxy monomer is similarly obtained by random copolymerization, block copolymerization or graft copolymerization of an unsaturated epoxy monomer. By the unsaturated epoxy monomer is meant a monomer having at least one polymerizable unsaturated bond and at least one epoxy group in the molecule. As the unsaturated epoxy monomer, there can be mentioned, for example, unsaturated glycidyl esters represented by the following general formula:

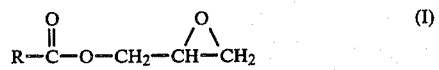

wherein R stands for a hydrocarbon group having a polymerizable, ethylenically unsaturated bond, unsaturated glycidyl ethers represented by the following general formula:

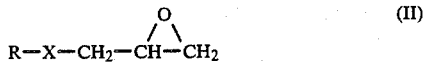

wherein R is as defined above in the formula (I) and X is a divalent group —CH$_2$—O— or

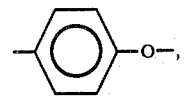

and epoxyalkenes represented by the following general formula:

wherein R is as defined in the formula (I) and R' stands for a hydrogen atom or a methyl group.

As specific examples, there can be mentioned glycidyl acrylate, glycidyl methacrylate, mono- and di-glycidyl esters of itaconic acid, mono-, di- and tri-glycidyl esters of butene-tricarboxylic acid, mono- and di-glycidyl esters of citraconic acid, mono- and di-glycidyl esters of endo-cis-bicyclo(2,2,1)hepto-5-ene-2,3-dicarboxylic acid, mono- and di-glycidyl esters of endo-cis-bicyclo(2,2,1)hepto-5-ene-2-methyl-2,3-dicarboxylic acid, mono- and di-glycidyl esters of allylsuccinic acid, glycidyl p-styrene-carboxylate, allyl glycidyl ether, 2-methylallyl glycidyl ether, styrene-p-glycidyl ether, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene and vinylcyclohexene monoxide. Among the foregoing compounds, glycidyl acrylate and glycidyl methacrylate are preferred.

The non-polar polymer (C) modified with a silane monomer having an olefinically unsaturated bond can be similarly obtained by random copolymerization, block copolymerization or graft polymerization of this silane monomer as in case of the above-mentioned modified polymers (A) and (B). Any of silane monomers having an olefinically unsaturated bond can be used, but a silane monomer having a hydrolyzable organic group as well as an olefinically unsaturated double bond is preferred. For example, silane monomers represented by the general formulae $RR^2SiY^1Y^2$, $R^1XSiY^1Y^2$ or $R^1SiY^1Y^2Y^3$ can be mentioned. In these formulae, $R^1$ and $R^2$, which may be the same or different, stand for a monovalent group having an olefinically unsaturated bond and comprising carbon and hydrogen optionally with oxygen.

As specific examples of such group, there can be mentioned vinyl, allyl, butenyl, cyclohexenyl and cyclopentadienyl groups, and groups having a terminal olefinic unsaturation are preferred. As other preferred examples, there can be mentioned groups having an ester bond of a terminal unsaturated carboxylic acid, such as $CH_2=C(CH_3)COO(CH_2)_3-$, $CH_2=C(CH_3)COO(CH_2)_2-O-(CH_2)_3-$ and $CH_2=C(CH_3)COOCH_2OCH_2CH_2(OH)CH_2O(CH_2)_3-$. Among these groups, a vinyl group is most preferred. X stands for an organic group free of an olefinically unsaturated bond. For example, there can be mentioned monovalent hydrocarbon groups such as methyl, ethyl, propyl, tetradecyl, octadecyl, phenyl, benzyl and tolyl groups, and halogen-substituted hydrocarbon groups. $Y^1$, $Y^2$ and $Y^3$, which may be the same or different, stand for a hydrolyzable group. For example, there can be mentioned alkoxy and alkoxyalkoxy groups such as methoxy, ethoxy, butoxy and methoxyethoxy groups, acyloxy groups such as formyloxy, acetoxy and propionoxy groups, oxime groups such as $-ON=C(CH_3)_2$, $-ON=CHCH_2C_2H_5$ and $-ON=C(C_6H_5)_2$, and substituted amino and acrylamino groups such as $-NHCH_3$, $-NHC_2H_5$ and $-NH(C_6H_5)$. Other optional hydrolyzable organic groups can also be used.

An organic silicon compound represented by the general formula $R^1SiY^1Y^2Y^3$ is preferably used in the present invention, and a compound of this general formula in which $Y^1$, $Y^2$ and $Y^3$ stand for the same group is especially preferred. A vinyltrisalkoxysilane is most preferred. For example, there can be mentioned vinyltrimethoxysilane, vinyltriethoxysilane and vinyltris(methoxyethoxy)silane. However, vinylmethyldiethoxysilane and vinylphenyldimethoxysilane can be similarly preferably used.

Among the above-mentioned modified non-polar polymers, non-polar polymers grafted with modifying monomers are especially preferred. Various known methods may be adopted for the production of the graft copolymers. For example, there can be mentioned a method in which a non-polar polymer is melted and a modifying monomer is added to the melt to effect graft copolymerization and a method in which a non-polar polymer is dissolved in a solvent and a modifying monomer is added to the solution to effect copolymerization. In each method, in order to advance the graft copolymerization at a high efficiency, it is preferred that reaction be carried out in the presence of a radical initiator. As the radical initiator, there can be mentioned organic peroxides, organic peresters and azo compounds. Moreover, ionizing radiations or ultraviolet rays may be used for generating radicals. Furthermore, it is preferred that the grafting ratio may be such that 1 to 15 parts by weight of the modifying monomer is grafted to 100 parts by weight of the non-polar polymer.

The proportions of the three components constituting the polymeric electret of the present invention (the modified non-polar polymers (A), (B) and (C) are collectively regarded as one component) are 60 to 99% by weight, especially 80 to 95% by weight, of the non-polar polymer, 0.5 to 39.5% by weight, especially 1 to 10% by weight, of the polar polymer, and 0.5 to 20% by weight, especially 4 to 10% by weight, of at least one modified non-polar polymer selected from the above-mentioned modified non-polar polymers (A), (B) and (C). If the amount of the non-polar polymer is smaller than 60% by weight, it is apprehended that the non-polar polymer will not form a matrix in the three-component blend system, and in many cases, trapped charges readily escape and the charge stability of the electret is poor. It is indispensable that the polar polymer should be present in an amount of at least 0.5% by weight. If the amount of the polar polymer is smaller than 0.5% by weight, increase of the quantity of trapped charges is not so conspicuous and the obtained electret has a low charge density and an insufficient capacity. The reason why the upper limit of the amount of the polar polymer is set at 39.5% by weight is that even if the polar polymer is incorporated in an amount exceeding this upper limit, the obtained charge density is not significantly enhanced and it becomes difficult to disperse the polar polymer as the domain in a good condition into the matrix of the non-polar polymer. In order to produce micro-dispersion of the domain of polar polymer in the matrix of the non-polar polymer, it is preferred that the modified non-polar polymer be incorporated in an amount of at least 0.5% by weight. Even if the modified non-polar polymer is incorporated in an amount exceeding 20% by weight, no substantial increase of the micro-dispersing effect can be expected. It is preferred that a modified non-polar polymer in which the main skeleton consists of the same non-polar polymer as that used for the matrix be used.

Additives customarily used for polymers, such as a heat-resistant stabilizer, a weathering-resistant stabilizer, an antistatic agent, a slip agent, an antiblocking agent, a lubricant, an inorganic or organic filler, a dye and a pigment, may be added to the above-mentioned polymer composition.

Various known methods may be utilized for the production of the polymeric electret of the present invention. For example, there can be mentioned a heat electret obtained by heating the above-mentioned polymer composition at a melting or softening temperature and cooling the heated composition while applying a high direct current voltage thereto, an electroelectret obtained by forming the polymer composition into a film and applying a corona discharge or pulsating high voltage to the surfaces of the film or applying a high direct current voltage to the surfaces of the film while holding both the surfaces of the film by another dielectric member, a radioelectret obtained by irradiation with γ-rays or electron beams, a magnetoelectret obtained by melting the polymer composition and gradually cooling the melt under a strong static magnetic field, a mechanoelectret obtained by plastic deformation under compression, and an autoelectret obtained by applying a voltage under irradiation with light. As the preferred method, there can be mentioned a method in which the above-mentioned polymer composition is shaped into a film and the film is subjected to intermittent corona discharge under heating after or without monoaxial or biaxial drawing, and a method in which the polymer composition is shaped into a film and the film is subjected to corona discharge in the state where pairs of needle electrodes are brought close to both the surfaces of the film.

In the so-obtained polymeric electret of the present invention, since the domain of the polar polymer is micro-dispersed (the domain particle size is smaller than 10 μm even if the ordinary melt-blending method is adopted) in the matrix of the non-polar polymer through the mediation of the modified non-polar polymer, the area of the interface between the non-polar polymer and the polar polymer is increased and the quantity of trapped charges is drastically increased, with the result that the charge density is increased. Furthermore, since the matrix is formed of the non-polar polymer, once trapped charges do not readily escape, and therefore, an electret in which charges can be stably retained for a long time can be obtained. Moreover, since the domain particle size is smaller than 10 μm as pointed out above, a firmly electret having a thin thickness can be prepared.

The electret of the present invention has a surface charge density of $5 \times 10^{-9}$ to $100 \times 10^{-9}$ Coulomb/cm$^2$, especially $10 \times 10^{-9}$ to $50 \times 10^{-9}$ Coulomb/cm$^2$ as measured in the state of a film. Furthermore, when this electret is allowed to stand still in an environment maintained at a temperature of 60° C. and a relative humidity of 90% for 1 hour, the surface charge density retention ratio is at least 50%. This is quite a surprising characteristic of the electret of the present invention. As shown in the examples given hereinafter, in the case of an electret composed solely of a non-polar polymer or an electret having a dispersion structure formed by dispersing a polar polymer in a non-polar polymer, the surface charge density is drastically reduced under the above-mentioned high temperature and high humidity conditions. It is considered that the reason is that in the case of the former electret, the places where charges are trapped are portions unstable to the temperature and humidity, such as the interface between the polymer and impurities and the interface between the crystalline portion and the non-crystalline portion, and in the case of the latter electret, the polar polymer is not sufficiently enveloped by the non-polar polymer having a high electric insulating property and hence, charges are allowed to disappear under the above-mentioned conditions.

In contrast, in the electret of the present invention, by incorporation of the modified non-polar polymer which has a good affinity with both the non-polar polymer and the polar polymer, micro-dispersion of the polar polymer into the non-polar polymer matrix is promoted by this modified non-polar polymer and fine domain particles of the polar polymer are completely enveloped by the non-polar polymer. Therefore, a high surface charge density can be obtained and a high surface charge can be retained even under high temperature and high humdity conditions.

Incidentally, it must be noted that the above-mentioned surface charge density is measured for the electret in the form of a film having a charge-deposited surface extending in a certain direction. Namely, in the case of a fibrous electret, charge-deposited surfaces are randomly located and it is difficult to determine the surface area, and therefore, it is impossible to measure the surface charge density.

The electret of the present invention can be used in any of the known forms, for example, in the form of a film, a sheet or a fiber. Since the domain particles are very fine in the electret of the present invention, if the electret of the present invention is shaped into a film having a thickness of 5 to 15 μm, especially prominent effects can be attained with respect to the charge-retaining characteristics.

Furthermore, since a film of the above-mentioned resin composition can be easily fibrilated by drawing, a fibrous electret in the form of a staple fiber, a filament, a yarn, a rope, a filmy yarn or a split yarn by drawing the film, subjecting the obtained film to a slit or split treatment and, if necessary, cutting the fibrils can be formed. Of course, this fibrous electret can be formed into a fibrous article by a known processing such as weaving, knitting, tufting or formation of a non-woven fabric.

A preferred use of the polymeric electret of the present invention is an air filter. In order to improve the dust collecting efficiency of an air filter, it is important that a high charge density should be stably retained over a long period and the electret should be formed in a fiber as fine as possible. Since both the conditions are satisfied in the polymeric electret of the present invention, if the electret of the present invention is used as an air filter, an excellent capacity can be manifested. Known methods may be adopted for preparing an air filter from the electret of the present invention. For example, there may be adopted a method in which a thin filmy electret, optionally drawn, obtained according to the above mentioned method is split by a pin roller and, if necessary, beaten to obtain a fibrous electret which is then gathered and deposited in the form of an air filter, and a method in which sheets of the thin filmy electret are optionally laminated together with other core material (which may be an electret) to form a filter.

Furthermore, the electret of the present invention can be used as a material of a sound device such as a microphone, a pickup or a speaker, a material to be used in the field of electrophotography or printing or a medical material, especially a material for a medical tool to be contacted with blood.

The present invention will now be described in detail with reference to the following examples that by no means limit the scope of the invention.

Examples concerning the stability of the surface charge density are first described.

COMPARATIVE EXAMPLE 1

Homopolypropylene (PP) having a melt index of 6.5 g/10 min (ASTM D-1238-L, hereinafter referred to as "MI") and a density of 0.91 g/cc was shaped into a film having a thickness of 30 μm according to the inflation film-forming method. The film-forming temperature was 200° C.

The film was cut into a size of 5 cm×5 cm and formed into an electret by cornoa discharge under conditions described below by using an apparatus shown in FIG. 1, wherein needle electrodes 1 and 2, being negatively and positively charged respectively, confine between them the polymer film sample 3. The electrodes are connected to a direct current battery 4.

Electret-Forming Conditions

Sample temperature: 23° C.
Voltage: direct current 7 KV
Applying time: 7 seconds
Electrode spacing: 8 mm The obtained electret film was allowed to stand still under environmental conditions shown in Table 1 for 1 hour. The surface charge density on the negative electrode side was measured at room temperature before and after standing.

Figure 2:
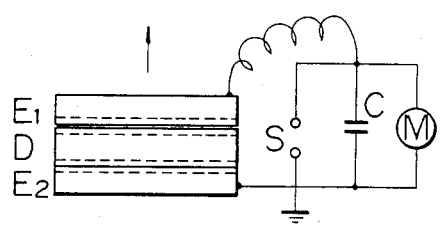
FIG. 2 is a circuit diagram illustrating a circuit for measuring the surface charge density.

The surface charge density was measured in the following manner by using a measuring circuit shown in FIG. 2. In the state shown in FIG. 2, a switch S was once closed and was then opened to bring up a moving electrode E1 on one side of the electret film sample D, the electrode E2 being fixed. At this point, charges induced by the electrode E1 were transferred to a capacitor C and a voltage difference V was produced between terminals of the capacitor C. This voltage difference was measured by a potentiometer M, and the surface charge density $\delta$ was calculated according to the formula:

$$\delta = \frac{CV}{A}$$

wherein C stands for the capacity (F) of the capacitor and A stands for the surface area (cm$^2$) of the electret. The obtained results are shown in Table 1.

COMPARATIVE EXAMPLE 2

A film having a thickness of 30 μm was prepared in the same manner as described in Comparative Example 1 except that a mixture comprising 95% by weight of the same homopolypropylene as used in Comparative Example 1 and 5% by weight of polyethylene terephthalate (PET) having a melting point of 265° C. was kneaded at 280° C. by using an extruder.

In the same manner as described in Comparative Example 1, the film was formed into an electret and the surface charge density of the obtained electret film was measured. The obtained results are shown in Table 1.

COMPARATIVE EXAMPLE 3

An inflation film having a thickness of 30 μm was prepared in the same manner as described in Comparative Example 1 except that a mixture comprising 95% by weight of the same homopolypropylene as used in Comparative Example 1 and 5% by weight of polybutylene terephthalate (PBT) having a melting point of 225° C. was kneaded at 280° C. by using an extruder.

In the same manner as described in Comparative Example 1, an electric film was prepared and the surface charge density was measured. The obtained results are shown in Table 1.

COMPARATIVE EXAMPLE 4

An inflation film having a thickness of 30 μm was prepared in the same manner as described in Comparative Example 1 except that a mixture comprising 95% by weight of the same homopolypropylene as used in Comparative Example 1 and 5% by weight of polycarbonate (PC) having a softening point of 150° C. was kneaded at 260° C. by using an extruder.

In the same manner as described in Comparative Example 1, an electret film was prepared and the surface charge density was measured. The obtained results are shown in Table 1.

EXAMPLE 1

A mixture comprising 92% by weight of the same homopolypropylene as used in Comparative Example 1, 5% by weight of the same polyethylene terephthalate as used in Comparative Example 2 and 3% by weight of maleic anhydride-grafted polypropylene (grafting ratio=3% by weight) was kneaded at 280° C. in an extruder and an inflation film having a thickness of 30 μm was formed.

In the same manner as described in Comparative Example 1, an electret film was prepared and the surface charge density was measured. The obtained results are shown in Table 1.

EXAMPLE 2

A mixture comprising 92% by weight of the same homopolypropylene as used in Comparative Example 1, 5% by weight of the same polybutylene terephthalate as used in Comparative Example 3 and 3% by weight of maleic anhydride-grafted polypropylene (grafting ratio=3% by weight) was kneaded at 280° C. in an extruder and an inflation film having a thickness of 30 μm was prepared.

In the same manner as described in Comparative Example 1, an electret film was prepared and the surface charge density was measured. The obtained results are shown in Table 1.

EXAMPLE 3

A mixture comprising 92% by weight of the same homopolypropylene as used in Comparative Example 1, 5% by weight of the same polycarbonate as used in Comparative Example 4 and 3% by weight of maleic anhydride-grafted polypropylene (grafting ratio=3% by weight) was kneaded at 260° C. in an extruder, and an inflation film having a thickness of 30 μm was formed.

In the same manner as described in Comparative Example 1, an electret film was prepared and the surface charge density was measured. The obtained results are shown in Table 1.

EXAMPLE 4

A mixture comprising 92% by weight of the same homopolypropylene as used in Comparative Example 1, 5% by weight of the same polyethylene terephthalate as used in Comparative Example 2 and 3% by weight of vinyltrimethoxysilane-grafted polypropylene (grafting ratio=3% by weight) was kneaded at 280° C. in an extruder and an inflation film having a thickness of 30 μm was formed.

In the same manner as described in Comparative Example 1, an electret film was prepared and the surface charge density was measured. The obtained results are shown in Table 1.

EXAMPLE 5

A mixture comprising 92% by weight of the same homopolypropylene as used in Comparative Example 1, 5% by weight of the same polybutylene terephthalate as used in Comparative Example 3 and 3% by weight of the same vinylsilane-grafted polypropylene (grafting ratio=3% by weight) as used in Example 4 was kneaded at 280° C. in an extruder and an inflation film having a thickness of 30 μm was formed.

In the same manner as described in Comparative Example 1, an electret film was prepared and the surface charge density was measured. The obtained results are shown in Table 1.

EXAMPLE 6

A mixture comprising 92% by weight of the same homopolypropylene as used in Comparative Example 1, 5% by weight of the same polycarbonate as used in Comparative Example 4 and 3% by weight of the same vinylsilane-grafted polypropylene (grafting ratio=3% by weight) as used in Example 4 was kneaded at 260° C.

in an extruder and an inflation film having a thickness fo 30 μm was formed.

In the same manner as described in Comparative Example 1, an electret film was prepared and the surface charge density was measured. The obtained results are shown in Table 1.

EXAMPLE 7

A mixture comprising 92% by weight of the same homopolypropylene as used in Comparative Example 1, 5% by weight of the same polyethylene terephthalate as used in Comparative Example 2 and 3% by weight of glycidylacrylate-grafted polypropylene (grafting ratio=3% by weight) was kneaded at 280° C. in an extruder and an inflation film having a thickness of 30 μm was formed.

In the same manner as described in Comparative Example 1, an electret film was prepared and the surface charge density was measured. The obtained results are shown in Table 1.

EXAMPLE 8

A mixture comprising 92% by weight of the same homopolypropylene as used in Comparative Example 1, 5% by weight of the same polybutylene terephthalate as used in Comparative Example 3 and 3% by weight of the same epoxidized polypropylene (epoxidizing ratio=3% by weight) as used in Example 7 was kneaded at 280° C. in an extruder and an inflation film having a thickness of 30 μm was formed.

In the same manner as described in Comparative Example 1, an electret film was prepared and the surface charge density was measured. The obtained results are shown in Table 1.

EXAMPLE 9

A mixture comprising 92% by weight of the same homopolypropylene as described in Comparative Example 1, 5% by weight of the same polycarbonate as used in Comparative Example 4 and 3% by weight of the same epoxidized polypropylene (epoxidization ratio=3% by weight) as used in Example 7 was kneaded at 260° C. in an extruder and an inflation film having a thickness of 30 μm was formed.

In the same manner as described in Comparative Example 1, an electret film was prepared and the surface charge density was measured. The obtained results are shown in Table 1.

TABLE 1

| | Surface Charge Density and Retention Ratio | | | | | | | | |
|---|---|---|---|---|---|---|---|---|---|
| | temperature of 40° C. relative humidity of 90% | | | temperature of 60° C. relative humidity of 90% | | | temperature of 86° C. relative humidity of 18% | | |
| | $\sigma_0$ ($10^{-9}$C/cm$^2$) | $\sigma_1$ ($10^{-9}$C/cm$^2$) | $\sigma_1/\sigma_0$ | $\sigma_0$ ($10^{-9}$C/cm$^2$) | $\sigma_2$ ($10^{-9}$C/cm$^2$) | $\sigma_2/\sigma_0$ | $\sigma_0$ ($10^{-9}$C/cm$^2$) | $\sigma_3$ ($10^{-9}$C/cm$^2$) | $\sigma_3/\sigma_0$ |
| Example No. | | | | | | | | | |
| 1. PP/PET/maleic anhydride-grafted PP 92/5/3 | 18 | 18 | 1.0 | 17 | 12 | 0.71 | 17 | 5.2 | 0.31 |
| 2. PP/PBT/maleic anhydride-grafted PP 92/5/3 | 16 | 16 | 1.0 | 16 | 10 | 0.63 | 15 | 4.7 | 0.31 |
| 3. PP/polycarbonate/maleic anhydride-grafted PP 92/5/3 | 18 | 18 | 1.0 | 17 | 12 | 0.71 | 15 | 5.6 | 0.37 |
| 4. PP/PET/vinylsilane-grafted PP 92/5/3 | 19 | 18 | 0.95 | 19 | 12 | 0.63 | 19 | 5.2 | 0.27 |
| 5. PP/PBT/vinylsilane-grafted PP 92/5/3 | 17 | 17 | 1.0 | 19 | 11 | 0.58 | 19 | 5.1 | 0.27 |
| 6. PP/polycarbonate/vinylsilane-grafted PP 92/5/3 | 20 | 19 | 0.95 | 20 | 14 | 0.70 | 20 | 4.6 | 0.23 |
| 7. PP/PET/epoxidized PP 92/5/3 | 17 | 16 | 0.94 | 18 | 10 | 0.56 | 17 | 5.2 | 0.31 |
| 8. PP/PBT/epoxidized PP 92/5/3 | 21 | 20 | 0.95 | 19 | 11 | 0.58 | 19 | 4.7 | 0.25 |
| 9. PP/polycarbonate/epoxidized PP 92/5/3 | 17 | 17 | 1.0 | 18 | 12 | 0.67 | 18 | 5.3 | 0.29 |
| Comparative Example No. | | | | | | | | | |
| 1. PP | 14 | 10 | 0.71 | 13 | 3.9 | 0.30 | 14 | 0.98 | 0.070 |
| 2. PP/PET 95/5 | 16 | 8.3 | 0.52 | 15 | 4.1 | 0.27 | 16 | 1.4 | 0.088 |
| 3. PP/PBT 95/5 | 17 | 6.8 | 0.40 | 17 | 3.6 | 0.21 | 15 | 0.75 | 0.050 |
| 4. PP/polycarbonate 95/5 | 17 | 7.7 | 0.45 | 16 | 3.5 | 0.22 | 17 | 1.5 | 0.088 |

From the results shown in Table 1, it is understood that an electret comprising a composition of the three components specified in the present invention has a higher surface charge density than known electrets and according to the present invention, there can be attained an unexpected effect of retaining the surface charge density at a very high retention ratio when the electret is placed under high humidity conditions, high temperature conditions or high temperature and high humidity conditions.

Examples concerning the dust-collecting efficiency of air filters are now described.

COMPARATIVE EXAMPLES 5 THROUGH 8 AND EXAMPLES 10 THROUGH 18

Preparation of Filter Material

Resin compositions of Comparative Examples 1 through 4 and Examples 1 through 9 were formed into films having a thickness of 50 to 60 μm and a folding width of 350 mm according to the inflation film-forming process.

Each folded tube was continuously cut on both the side ends to form two films having a width of 300 mm.

Each film was supplied to an electret-forming apparatus as shown in FIG. 1, and the film was formed into an electret under conditions of an applied voltage of 12

KV (direct current), an electrode spacing of 27 mm and a corona discharge residence time of 0.8 second.

The obtained film electret was heated at 110° to 120° C. by a heating roll and roll-drawn at a draw ratio of about 6 to about 8 in the longitudinal direction to form a drawn film having a thickness of 10 to 20 μm.

The drawn electret film was split by a pin roller and wound on a drum.

The split film was torn at knot points of the net-like texture by an opener and cut into a fiber length of 20 to 50 mm by means of a cutter.

The obtained cut fibers (staple fibers) were supplied to a web-forming machine and formed into a web. The web was needle-punched to obtain a filter material having a basis weight of 300 g/m$^2$ and a thickness of 5 mm.

Figure 3:
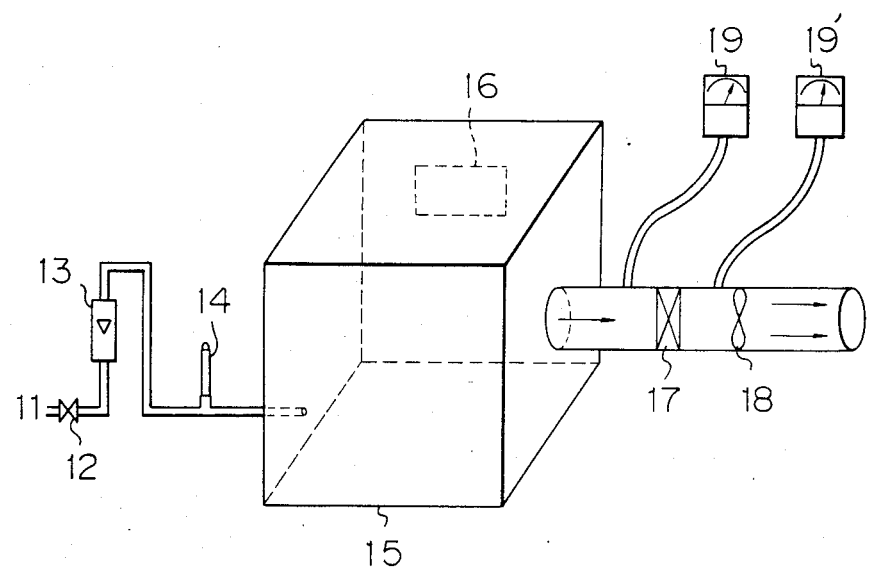
FIG. 3 is a perspective view illustrating a measuring apparatus for measuring the dust collecting efficiency.

A filter disc having a diameter of 300 mm was cut from the filter material, and the filter efficiency of collecting dust from tobacco smoke was determined according to the following method. Measurement of Dust Collecting Efficiency The measurement was carried out by using a measuring apparatus shown in FIG. 3. A filter material 17 to be measured was set and an adjusting valve 12 was opened admitting air through inlet 11, and smokes of a tobacco 14 were introduced into a chamber 15 (1 m×1 m×1.3 m (height)) having a viewing window 16. A blower 18 was driven and smoke-containing air in the chamber 15 was sucked out through the filter material 17. The air speed was adjusted to 0.2 m/sec and 0.8 m/sec, according to air flow meter 13, respectively by the adjusting valve 12, and the dust concentration was measured on the introduction side 19 and discharge side 19' of the filter material 17. A digital dust meter Model P-5 supplied by Shibata Kagaku Kikai Kogyo K.K. was used for measuring the dust concentration, and the dust concentration was determined according to the light scattering method.

The dust collecting efficiency was calculated according to the following formula: Dust collecting efficiency (%)=Cin—Cout/Cin×100 wherein Cin stands for the dust concentration (mg/m$^3$) on the introduction side of the filter and Cout stands for the dust concentration (mg/m$^3$) on the discharge side of the filter. The obtained results are shown in Table 2.

TABLE 2

| | Dust Collecting Efficiency | | |
|---|---|---|---|
| | Resin Composition | Air Speed of 0.2 m/sec | Air Speed of 0.8 m/sec |
| Comparative Example No. | Comparative Example | | |
| 5 | 1 | 38% | 25% |
| 6 | 2 | 35% | 20% |
| 7 | 3 | 27% | 17% |
| 8 | 4 | 39% | 24% |
| Example No. | Example | | |
| 10 | 1 | 57% | 52% |
| 11 | 2 | 48% | 39% |
| 12 | 3 | 59% | 55% |
| 13 | 4 | 55% | 53% |
| 14 | 5 | 44% | 35% |
| 15 | 6 | 59% | 56% |
| 16 | 7 | 53% | 50% |
| 17 | 8 | 47% | 40% |
| 18 | 9 | 55% | 52% |

From the results shown in Table 2, it will be readily understood that an electret filter composed of the resin composition specified in the present invention has a much higher dust collecting efficiency than known electret filters.

We claim:

1. A high-performance electret comprising 60 to 99% by weight of a non-polar polymer, 0.5 to 39.5% by weight of a polar polymer and 0.5 to 20% by weight of at least one component selected from the group consisting of (A) a non-polar polymer modified with an unsaturated carboxylic acid or a derivative thereof, (B) a non-polar polymer modified with an unsaturated epoxy monomer and (C) a non-polar polymer modified with a silane monomer having an olefinically unsaturated bond.

2. A high-performance electret as set forth in claim 1, wherein the non-polar polymer is a polyolefin or polystyrene.

3. A high-performance electret as set forth in claim 1 or 2, wherein the polar polymer is a polyester, polycarbonate or polyamide.

4. A high performance electret as set forth in claim 3 wherein the component is a non-polar polymer modified by grafting.

5. A high-performance electret as set forth in claim 1 or 2, wherein the component is a non-polar polymer modified by grafting.

6. An air filter composed substantially of a fibrous polymeric electret, said electret comprising 60 to 99% by weight of a non-polar polymer, 0.5 to 39.5% by weight of a polar polymer and 0.5 to 20% by weight of at least one component selected from the group consisting of (A) a non-polar polymer modified with an unsaturated carboxylic acid or a derivative thereof, (B) a non-polar polymer modified with an unsaturated epoxy monomer and (C) a non-polar polymer modified with a silane monomer having an olefinically unsaturated bond.

* * * * *